US009856363B2

(12) United States Patent
Hicks et al.

(10) Patent No.: US 9,856,363 B2
(45) Date of Patent: Jan. 2, 2018

(54) COLORED COMPOSITE PAVEMENT STRUCTURE

(75) Inventors: Steven Hicks, Freehold, NJ (US);
David K. Bower, Canton, MI (US);
William Handlos, Manitowoc, WI (US)

(73) Assignees: BASF SE, Ludwigshafen (DE);
Pervious Paving Contractors LLC, Higbee, MO (US)

( * ) Notice: Subject to any disclaimer, the term of this patent is extended or adjusted under 35 U.S.C. 154(b) by 1118 days.

(21) Appl. No.: 13/977,464

(22) PCT Filed: Dec. 29, 2010

(86) PCT No.: PCT/US2010/062433
§ 371 (c)(1),
(2), (4) Date: Sep. 13, 2013

(87) PCT Pub. No.: WO2012/091707
PCT Pub. Date: Jul. 5, 2012

(65) Prior Publication Data
US 2014/0106124 A1 Apr. 17, 2014

(51) Int. Cl.
*C08K 3/40* (2006.01)
*C03C 1/00* (2006.01)
(Continued)

(52) U.S. Cl.
CPC ............... *C08K 3/40* (2013.01); *C03C 1/002* (2013.01); *C03C 1/024* (2013.01); *C04B 14/22* (2013.01);
(Continued)

(58) Field of Classification Search
CPC .......... C04B 14/22; C04B 14/32; C03C 17/28
(Continued)

(56) References Cited

U.S. PATENT DOCUMENTS 3,240,736 A 3/1966 Beckwith
3,272,098 A 9/1966 Buchholtz et al.
(Continued)

FOREIGN PATENT DOCUMENTS

CA 2037214 A1 9/1991
CN 1609340 A 4/2005
(Continued)

OTHER PUBLICATIONS

English language abstract and machine-assisted translation for DE 10231858 extracted from espacenet.com database on Nov. 14, 2013, 19 pages.
(Continued)

*Primary Examiner* — Jacob T Minskey
*Assistant Examiner* — Xue Liu
(74) *Attorney, Agent, or Firm* — Burris Law, PLLC (57) ABSTRACT

A process for making a colored composite pavement structure comprising silylated glass aggregate particles and a polymeric binder composition is disclosed. Systems and methods are also disclosed for providing a colored composite material that cures into a pavement structure. In one embodiment, a colorant concentrate is provided by combining an inorganic colorant with a portion of a first component of a polymeric binder composition. The colorant concentrate can then be combined with the first and second components of the polymeric binder composition to provide a colored polymeric binder composition. The colored polymeric binder composition may then be applied to silylated glass aggregate particles to provide a colored composite material that cures into a pavement structure.

13 Claims, 4 Drawing Sheets

(51) Int. Cl.

| | | |
|---|---|---|
| *C03C 1/02* | (2006.01) | |
| *C04B 14/22* | (2006.01) | |
| *C04B 26/16* | (2006.01) | |
| *E01C 7/08* | (2006.01) | |
| *E01C 7/35* | (2006.01) | |
| *E01C 19/10* | (2006.01) | |
| *C08K 9/06* | (2006.01) | |
| *C04B 111/00* | (2006.01) | |

(52) U.S. Cl.
CPC ............... *C04B 26/16* (2013.01); *C08K 9/06* (2013.01); *E01C 7/085* (2013.01); *E01C 7/35* (2013.01); *E01C 19/104* (2013.01); *C04B 2111/0075* (2013.01); *Y10T 428/24372* (2015.01)

(58) Field of Classification Search
USPC .......................................... 264/333, 331.11
See application file for complete search history.

(56) References Cited

U.S. PATENT DOCUMENTS

| | | |
|---|---|---|
| 3,396,644 A | 8/1968 | Banks |
| 3,577,893 A | 5/1971 | Towner |
| 3,690,021 A | 9/1972 | Glass et al. |
| 3,690,227 A | 9/1972 | Welty |
| 3,711,444 A | 1/1973 | Allen et al. |
| 3,850,537 A | 11/1974 | Bynum, Jr. |
| 3,909,474 A | 9/1975 | Borchert et al. |
| 3,911,667 A | 10/1975 | Komiyama |
| 3,958,891 A | 5/1976 | Eigenmann |
| 4,021,401 A | 5/1977 | Jeppsen |
| 4,063,839 A | 12/1977 | Brown |
| 4,076,917 A | 2/1978 | Swift et al. |
| 4,088,633 A * | 5/1978 | Gurney ............. C08G 59/1438 528/103 |
| 4,097,423 A | 6/1978 | Dieterich |
| 4,112,176 A | 9/1978 | Bailey |
| 4,114,382 A | 9/1978 | Kubens et al. |
| 4,139,676 A | 2/1979 | Janssen et al. |
| 4,157,907 A | 6/1979 | Kroyer |
| 4,247,933 A | 1/1981 | Nakamura |
| 4,271,493 A | 6/1981 | Tamaru et al. |
| 4,433,701 A | 2/1984 | Cox et al. |
| 4,441,821 A | 4/1984 | Burkhart et al. |
| 4,452,551 A | 6/1984 | Arndt et al. |
| 4,459,239 A | 7/1984 | Di Toro et al. |
| 4,550,153 A | 10/1985 | Carver |
| 4,630,963 A | 12/1986 | Wyman |
| 4,659,748 A | 4/1987 | Boddie |
| 4,761,099 A | 8/1988 | Mann et al. |
| 4,792,262 A | 12/1988 | Kapps et al. |
| 4,797,026 A | 1/1989 | Webster |
| 4,915,539 A | 4/1990 | Yoshikane et al. |
| 4,922,463 A | 5/1990 | Del Zotto et al. |
| 5,001,190 A | 3/1991 | Carpenter et al. |
| 5,043,955 A | 8/1991 | Dubois et al. |
| 5,044,819 A | 9/1991 | Kilheffer et al. |
| 5,106,227 A | 4/1992 | Ahmad et al. |
| 5,123,778 A | 6/1992 | Bohnhoff |
| 5,149,192 A | 9/1992 | Hamm et al. |
| 5,182,137 A | 1/1993 | Allen |
| 5,225,210 A | 7/1993 | Shimoda |
| 5,250,340 A | 10/1993 | Bohnhoff |
| 5,298,539 A | 3/1994 | Singh et al. |
| 5,364,672 A | 11/1994 | Schultze-Kraft |
| 5,447,388 A | 9/1995 | Rouse |
| 5,480,256 A | 1/1996 | Itsekson et al. |
| 5,494,741 A | 2/1996 | Fekete et al. |
| 5,590,976 A | 1/1997 | Kilheffer et al. |
| 5,648,421 A | 7/1997 | Thiele et al. |
| 5,693,413 A | 12/1997 | Hesterman et al. |
| 5,788,407 A | 8/1998 | Hwang |
| 5,836,715 A | 11/1998 | Hendrix et al. |
| 5,848,856 A | 12/1998 | Bohnhoff |
| 5,891,938 A | 4/1999 | Williams |
| 5,936,015 A | 8/1999 | Burns |
| 5,956,294 A | 9/1999 | Takizawa et al. |
| 6,007,233 A | 12/1999 | Cairns |
| 6,206,607 B1 | 3/2001 | Medico, Jr. et al. |
| 6,225,371 B1 | 5/2001 | Prerre |
| 6,235,367 B1 | 5/2001 | Holmes et al. |
| 6,370,087 B1 | 4/2002 | Akahane et al. |
| 6,372,135 B1 | 4/2002 | Kohlstadt et al. |
| 6,495,652 B1 | 12/2002 | Reichelt et al. |
| 6,702,514 B2 | 3/2004 | Kaneko et al. |
| 6,826,122 B2 | 11/2004 | Zaugg |
| 6,887,922 B1 | 5/2005 | Roddis |
| 6,962,463 B2 | 11/2005 | Chen |
| 7,041,221 B2 | 5/2006 | Arnott |
| 7,168,884 B2 | 1/2007 | Hart |
| 7,172,145 B2 | 2/2007 | Knepp |
| 7,342,056 B2 | 3/2008 | Patel et al. |
| 7,496,003 B2 | 2/2009 | Müller |
| 7,782,717 B2 | 8/2010 | Gil et al. |
| 7,879,921 B2 | 2/2011 | Cummins |
| 8,025,456 B2 | 9/2011 | Kaul |
| 2002/0016421 A1 | 2/2002 | Goeb et al. |
| 2002/0022086 A1 | 2/2002 | Hughes et al. |
| 2004/0074421 A1* | 4/2004 | Anderson ............... C04B 28/24 106/456 |
| 2004/0091712 A1* | 5/2004 | Marohn ................. C04B 28/02 428/417 |
| 2004/0109730 A1 | 6/2004 | Moss et al. |
| 2006/0293428 A1 | 12/2006 | Singh et al. |
| 2007/0091727 A1 | 4/2007 | Bonvin et al. |
| 2007/0093602 A1 | 4/2007 | Thompson-Colon et al. |
| 2007/0172590 A1 | 7/2007 | Hoffmann et al. |
| 2007/0189109 A1 | 8/2007 | Long |
| 2007/0213456 A1 | 9/2007 | Singh et al. |
| 2008/0058461 A1 | 3/2008 | Cummins |
| 2008/0118637 A1 | 5/2008 | Serwin |
| 2008/0144444 A1 | 6/2008 | Mahler et al. |
| 2008/0151698 A1 | 6/2008 | Gil et al. |
| 2008/0253235 A1 | 10/2008 | Hiraga et al. |
| 2009/0062432 A1 | 3/2009 | Doesburg et al. |
| 2009/0067924 A1 | 3/2009 | Kaul |
| 2009/0067925 A1 | 3/2009 | Kaul |
| 2009/0095820 A1 | 4/2009 | Roser et al. |
| 2010/0212552 A1* | 8/2010 | Stratton ................. C04B 28/04 106/712 |
| 2012/0329943 A1 | 12/2012 | Hicks et al. |

FOREIGN PATENT DOCUMENTS

| | | |
|---|---|---|
| CN | 1968982 A | 5/2007 |
| CN | 1994955 A | 7/2007 |
| CN | 101357828 A | 2/2009 |
| DE | 651167 C | 10/1937 |
| DE | WO9829356 A2 | 7/1998 |
| DE | 20000015 U1 | 5/2000 |
| DE | WO02076900 A2 | 10/2002 |
| DE | 10231858 A1 | 1/2004 |
| EP | 0583086 A1 | 2/1994 |
| EP | 0445578 A2 | 10/1994 |
| EP | WO9500569 A1 | 1/1995 |
| EP | 0911304 A1 | 4/1999 |
| EP | 1176257 A2 | 1/2002 |
| EP | 1462571 A2 | 9/2004 |
| FR | 2188596 A5 | 1/1974 |
| FR | 2653360 A1 | 4/1991 |
| FR | 2791692 A1 | 10/2000 |
| GB | 1604405 A | 12/1981 |
| JP | S 63-319223 A | 12/1988 |
| JP | H 04-001309 A | 1/1992 |
| JP | H 10-102444 A | 4/1998 |
| JP | H 11-80304 A | 3/1999 |
| JP | 2002-021011 A | 1/2002 |
| JP | 2003-267953 A | 9/2003 |
| JP | 2004076527 A | 3/2004 |
| JP | 2007-132020 A | 5/2007 |
| JP | 2007-285045 A | 11/2007 |
| JP | 2007-289869 A | 11/2007 |

(56) References Cited

FOREIGN PATENT DOCUMENTS

| JP | 2008-502773 A | 1/2008 |
|---|---|---|
| JP | 2009-293326 A | 12/2009 |
| KR | 96-0011358 B1 | 8/1996 |
| WO | WO 03/062532 A1 | 7/2003 |
| WO | WO 2004/014815 A1 | 2/2004 |
| WO | WO2009033037 A1 | 3/2009 |
| WO | WO2010149737 A1 | 12/2010 |
| WO | WO2011084274 A1 | 7/2011 |
| WO | WO 2011084793 A1 | 7/2011 |
| WO | WO2011084802 A1 | 7/2011 |
| WO | WO2011084807 A1 | 7/2011 |
| WO | WO2012091707 A1 | 7/2012 |

OTHER PUBLICATIONS

International Search Report for Application No. PCT/US2010/062433 dated Jun. 10, 2011, 4 pages.
English language abstract for CN 101357828 extracted from espacenet.com database on Aug. 19, 2015, 1 page.
English language abstract and machine-assisted English translation for JP 2009-293326 extracted from espacenet.com database on Aug. 27, 2015, 44 pages.
English language abstract and machine-assisted English translation for JPS 63-319223 extracted from espacenet.com database on Aug. 24, 2016, 6 pages.
English language abstract and machine-assisted English translation for JP 2007-289869 extracted from espacenet.com database on Aug. 24, 2016, 34 pages.
English language abstract for KR 96-0011358 extracted from espacenet.com database and machine-assisted English translation for KR 96-0011358 extracted from KIPO database on Aug. 24, 2016, 7 pages.
Crouch, L. K., Cates, M., Dotson, V. James, Jr., Honeycutt, Keith B., and Badoe, D. A. "Measuring the Effective Air Void Content of Portland Cement Pervious Pavements," ASTM Journal of Cement, Concrete, and Aggregates, 25(1), 2003, 5 pages.
Database Chemical Abstracts, Chemi [Online], Oct. 7, 1991, Yamaguchi H. et al., "Manufacture of colored artificial stones with high strength", 2 pages.
Montes, F., Haselbach, L. "Measuring Hydraulic Conductivity in Pervious Concrete," Env. Eng. Sci. 23(6), 2006, 10 pages.
Montes, F., Valavala, S., and Haselbach, L. "A New Test Method for Porosity Measurements of Portland Cement Pervious Concrete," J. ASTM Int. 2(1), 2005, 13 pages.
Schaefer, V., Wang, K., Suleimman, M., and Kevern, J. "Mix Design Development for Pervious Concrete in Cold Weather Climates," Final Report, Civil Engineering, Iowa State University, 2006, 85 pages.
English language abstract and machine-assisted translation for CN1994955 extracted from the espacenet.corn database on Apr. 24, 2014, 11 pages.
Machine-assisted translation for DE651167 extracted from the espacenet.com database on Apr. 11, 2014, 5 pages.
English language abstract and machine-assisted translation for DE20000015 extracted from the espacenet.com database on Apr. 11, 2014, 5 pages.
English language abstract for EP0445578 extracted from the espacenet.com database on Apr. 12, 2014, 8 pages (including EP0445578).
English language abstract for EP0911304 extracted from the espacenet.com database on Apr. 12, 2014, 10 pages (including EP0911304).
English language abstract and machine-assisted translation for EP1176257 extracted from the espacenet.com database on Apr. 12, 2014, 15 pages.
English language abstract and machine-assisted translation for EP1462571 extracted from the espacenet.com database on Apr. 13, 2014, 6 pages.
English language abstract and machine-assisted translation for FR2188596 extracted from the espacenet.com database on Apr. 13, 2014, 5 pages.
English language abstract and machine-assisted translation for FR2653360 extracted from the espacenet.com database on Apr. 13, 2014, 6 pages.
English language abstract and machine-assisted translation for FR2791692 extracted from the espacenet.com database on Apr. 13, 2014, 4 pages.
English language abstract and machine-assisted translation for JP2004076527 extracted from the espacenet.com database on Apr. 13, 2014, 10 pages.
English language abstract and machine-assisted translation for WO02076900 extracted from the espacenet.com database on Apr. 13, 2014, 8 pages.
English language abstract and machine-assisted translation for WO9500569 extracted from the espacenet.com database on Apr. 13, 2014, 13 pages.
English language abstract and machine-assisted translation for WO9829356 extracted from the espacenet.com database on Apr. 13, 2014, 10 pages.
International Search Report for Application No. PCT/US2010/058582 dated Apr. 27, 2011, 4 pages.
International Search Report for Application No. PCT/US2010/058589 dated Nov. 4, 2011, 3 pages.
International Search Report for Application No. PCT/US2010/061558 dated Mar. 3, 2011, 3 pages.
International Search Report for Application No. PCT/US2010/061574 dated Mar. 4, 2011, 2 pages.
International Search Report for Application No. PCT/US2010/061587 dated Mar. 1, 2011, 2 pages.
People's Republic of China Search Report for Application No. 201080063254.8 dated Mar. 21, 2014, 2 pages.
English language abstract for CN 1968982 extracted from espacenet.com database on Dec. 2, 2015, 1 page (see also English language equivalent U.S. Pat. No. 7,342,056 previously submitted on Feb. 23, 2015).
English language abstract and machine-assisted English translation for JPH 04-001309 extracted from the PAJ database on Apr. 21, 2016, 6 pages.
English language abstract and machine-assisted English translation for JPH 10-102444 extracted from espacenet.com database on Apr. 21, 2016, 17 pages.
English language abstract and machine-assisted English translation for JPH 11-80304 extracted from espacenet.com database on Apr. 21, 2016, 13 pages.
English language abstract and machine-assisted English translation for JP 2002-021011 extracted from the PAJ database on Apr. 21, 2016, 17 pages.
English language abstract and machine-assisted English translation for WO 2004/014815 extracted from espacenet.com database on Apr. 21, 2016, 20 pages.
International Search Report for Application No. PCT/EP2010/058989 dated Aug. 19, 2011, 4 pages.
English language abstract for CN 1609340 extracted from espacenet.com database on Dec. 29, 2014, 2 pages.
English language abstract and machine-assisted English translation for JP 2003-267953 extracted from the PAJ database on Jan. 19, 2015, 27 pages.
English language abstract and machine-assisted English translation for JP 2007-132020 extracted from the PAJ database on Jan. 19, 2015, 21 pages.
English language abstract and machine-assisted English translation for JP 2007-285045 extracted from the PAJ database on Jan. 19, 2015, 13 pages.
English language abstract for JP 2008-502773 extracted from the PAJ database on Jan. 19, 2015, 1 page.

\* cited by examiner

ColorED COMPOSITE PAVEMENT STRUCTURE

RELATED APPLICATIONS

This application is the National Stage of International Patent Application No. PCT/US2010/062433, filed on Dec. 29, 2010, the content of which is incorporated herein by reference.

This application is being filed on 29 Dec. 2010, as a PCT International Patent application in the name of Reynolds Consumer Products, Inc., a U.S. national corporation, and BASF Corporation, a U.S. national corporation, applicants for the designation of all countries except the U.S., and Steven Hicks, a citizen of the United States, and David K. Bower, a citizen of the United States, and William Handlos, a citizen of the United States, applicants for the designation of the U.S. only.

TECHNICAL FIELD

This disclosure relates to composite pavement structures, and systems and methods for making composite pavement structures comprising silylated glass aggregate and colored polymeric binder compositions.

BACKGROUND

Waste or recycled glass is commonly provided for secondary uses through widespread recycling programs. One such secondary use of this type of glass is as a constituent component in pavement structures, for example parking surfaces. However, the potential applications for pavement structures comprising recycled glass can be limited where specific structural standards must be met and where a specific color or aesthetic affect of pavement is specified. Improvements in aggregate pavement structures are desired.

SUMMARY

A process for making a colored composite pavement structure is disclosed. The process may include the steps of providing a colorant, such as an inorganic pigment powder, having a first color and providing a first component and a second component of a polymeric binder composition. The colorant can be combined with a dilutant, such as a portion of the polymeric binder composition first component, to provide a colorant concentrate having about 10 to about 35 parts by weight colorant based on 100 parts by weight colorant concentrate. The colorant concentrate can then be combined with the first and second components of the polymeric binder composition to provide a colored polymeric binder composition having about 0.1 to about 10 parts by weight colorant powder based on 100 parts by weight of colored polymeric binder composition. Silylated glass aggregate particles may also be provided ranging from about 1/16 inch to about 1/2 inch in diameter wherein the glass aggregate particles are mixed with the colored polymeric binder composition. Subsequently, the polymeric binder composition can be allowed to react and bond with the glass aggregate particles to provide a colored composite material which subsequently cures to form a colored composite pavement structure.

A mixing system for producing a colored composite material that can cure into a colored composite pavement structure is also disclosed. The mixing system is for mixing at least one aggregate, a two component polymeric binder composition comprising a first component and a second component reactive with the first component, and a colorant concentrate. The mixing system can include an aggregate vessel for holding the aggregate, a first vessel for holding the colorant concentrate, a second vessel for holding the first component of the polymeric binder composition, and a third vessel for holding the second component of the polymeric binder composition. The mixing system may also include a mixer in fluid communication with the first, second and third vessels for mixing the first component, the second component, and the colorant concentrate together to form a colored polymeric binder composition. An applicator, such as a spray assembly, may also be provided that is constructed and arranged to apply the colored polymeric binder composition onto the aggregate at an application rate. Additionally, a mixing apparatus in communication with the aggregate vessel and the applicator may also be provided to mix the glass aggregate particles with the colored polymeric binder composition to provide a colored composite material curable into a pavement structure at a production rate. It is also possible to utilize a conveying system to transport the aggregate from the aggregate vessel to the mixing apparatus, and to provide pumps from each of the first, second and third vessels to pump fluid from the vessels and either to one of the other vessels or to the mixer. A controller may also be provided to control the application rate of the colored polymeric binder composition onto the glass aggregate and the production rate of the colored composite material curable into a colored composite pavement structure.

DETAILED DESCRIPTION

Figure 1:
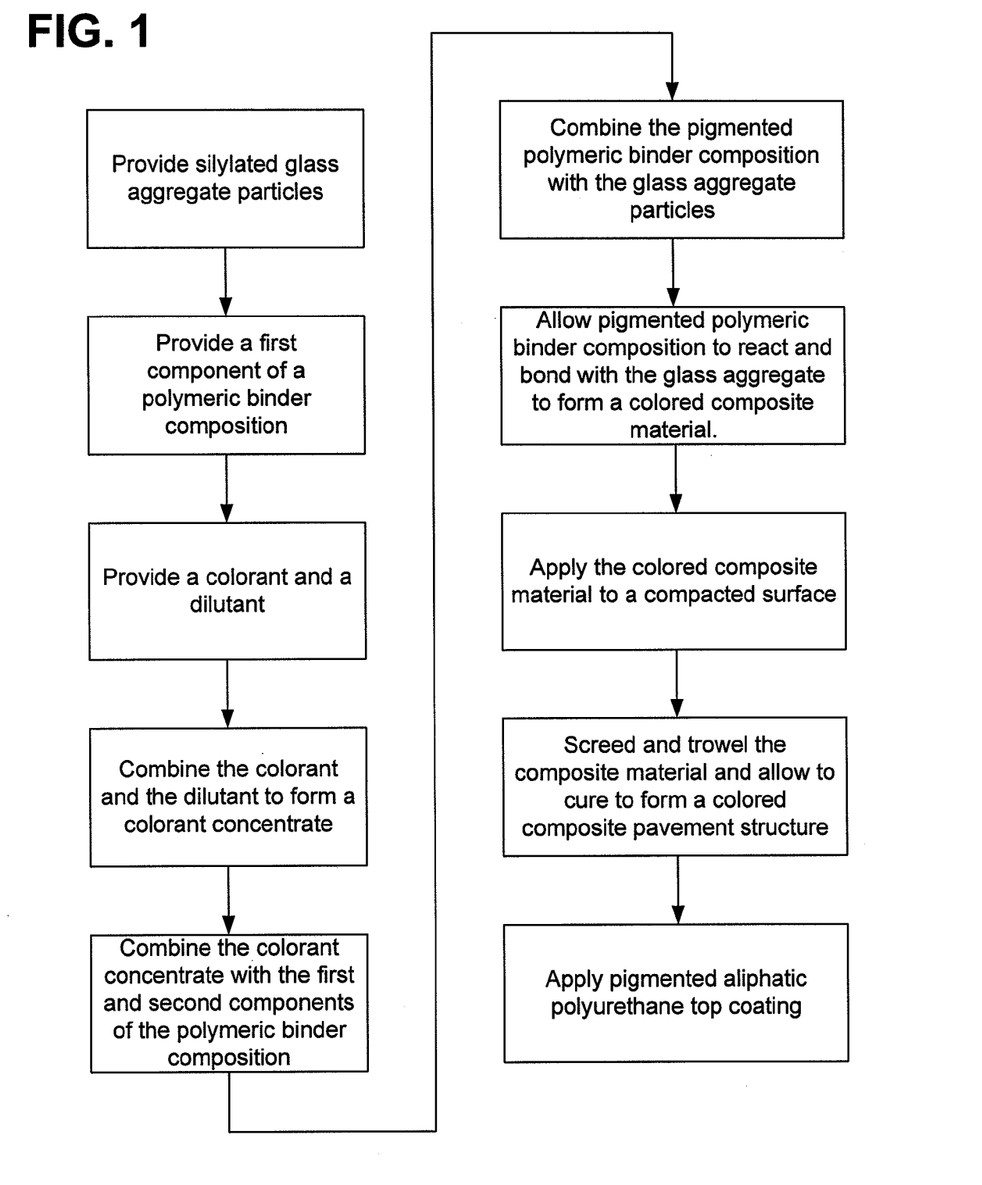
FIG. 1 is a schematic showing a method for providing a colored composite pavement structure.

This disclosure relates to a process for making a colored composite pavement structure comprising glass aggregate particles, a polymeric binder composition, and a colorant. One example of such a process is shown in FIG. 1.

In one step of the process, glass is provided and subsequently modified into glass aggregate particles. Although this disclosure discusses using glass as the aggregate in the composite pavement structure, one skilled in the art will appreciate that other aggregates, such as rock, may be used in combination or instead of glass aggregate. Where glass is used, the glass may be of any type and may be clear, tinted, and/or colored. Preferably, the glass is post-consumer waste recycled glass such that overall costs and environmental costs are minimized. The waste glass can be modified in a variety of ways, such as in the manner described in U.S. Patent Application Publications 2009/0067924 and 2009/0067925 to Kaul, both of which are hereby incorporated by reference. The glass aggregate particles are formed from glass that has been crushed, tumbled and heated to round its edges and remove non-glass impurities. A suitable recycled glass is described in U.S. Pat. No. 7,041,221 to Arnott, which is hereby incorporated by reference. Waste glass is prepared by crushing the glass to desired dimensions, e.g., $\frac{1}{16}$ inch to about 1 inch, preferably about $\frac{1}{4}$ inch to about $\frac{1}{2}$ inch, more preferably about $\frac{3}{8}$ inch. It is believed that reducing the average diameter of the glass reduces spalling of the aggregate from the composite pavement structure, once installed. The glass may be crushed using an impact crusher, hammer mill, cone crusher or a roller crusher. Preferably, the recyclable glass is crushed using roller crusher as better oil adsorption can be achieved.

Any order of pre-crushing, pre-screening, crushing, cleaning and drying may be used. In a preferred embodiment however, the crushed glass is first pre-crushed and pre-screened. If the glass is clean, no pre-crushing or pre-screening is required. The pre-crushed glass is pre screened through a mesh, which may include an inch mesh, a combination of double or triple deck screens or at least two meshes. Once pre-screened through the mesh, preferably the glass is further crushed using a roller crusher and subsequently, the crushed glass is dried, after cleaning, preferably at a temperature of at least 100° F. or, more preferably, at a temperature of at least 350° F. Subsequently, the crushed glass is screened, preferably through at least a 40 mesh screen, or more preferably through a 30 mesh screen, or most preferably through a 20 mesh screen. It is noted that the above described crushing process can result in about 50 percent by weight glass aggregate particles and about 50 percent by weight glass sand particles. Suitable grades of glass are commercially available from Glass Plus Inc. of Tomahawk, Wis.

Once the waste or recycled glass has been modified to form glass aggregate particles, the particles can be exposed to a coupling agent wherein the coupling agent reacts with and bonds to the glass to form primed glass aggregate particles. As used in this application, the phrase "primed glass aggregate particles" is meant to describe glass aggregate particles whose exterior surfaces have been at least partially coated by a substance that has chemically reacted with and bonded to the exterior surfaces. As used in this application, the phrase "coupling agent" is meant to include any substance that chemically reacts and bonds with glass and a polymeric binder composition to form a stronger bond between the glass and polymeric binder composition, as compared to a direct bond between glass and the polymeric binder composition. Exemplary coupling agents include silanes with functional groups of hydroxyl, thiol, epoxy, and/or primary and secondary amines. A particularly useful example of a coupling agent is aminosilane which will cause glass aggregate particles to become primed, or more specifically, silylated or silanized. It is noted that any silane or silanol functional group will operate to prime or silylate the glass aggregate particles. However, aminosilane is preferred because aminosilane is readily soluble in water meaning that an organic solvent is not required. As such, the use of aminosilane in an aqueous solution lowers the overall expense of the described process. Aminosilane concentrate is available commercially from Momentive Performance Materials of Albany, N.Y., examples of which are sold as SILQUEST® A-1100 and SILQUEST® A-1120. The priming or silylation process may be performed in a variety of ways, such as in the manner described in Patent Cooperation Treaty Application PCT/US10/58582 filed on Dec. 1, 2010, the entirety of which is hereby incorporated by reference. Once treated, the glass aggregate particles may be stored in a variety of discrete containers, such as superstacks and drums. Alternatively, the particles may be held in larger bulk quantities, as is the case with railcars and tankers.

Once the silylated glass aggregate particles have been transported to an end use site, the aggregate may be mixed with a polymeric binder composition to form a composite pavement structure. The polymeric binder composition may also be colored to form a colored composite pavement structure, as discussed in detail later. A full discussion of polymeric resin binders, and their use in mixing with aggregates to form a composite pavement structure, is provided in Patent Cooperation Treaty Application PCT/EP2010/058989, filed on Jun. 24, 2010, the entirety of which is incorporated by reference herein. A further discussion of such binders and their use is provided in U.S. Patent Application Publications 2009/0067924 and 2009/0067295 to Kaul. Other suitable binder compositions, for purposes of the present invention, are disclosed as "elastomeric compositions" in U.S. Provisional patent Application Ser. No. 61/288,637, the disclosure of which is incorporated in its entirety by reference herein.

One example of a polymeric binder composition is the reaction product of a two-part composition comprising a first component and a second component. As such, it is to be appreciated that the term two-component refers to these components. Other additional components may be used. The binder composition may be referred to in the art as a 2K system. The first and second components are mixed to form the reaction product of the binder composition. The term reaction product as used herein is intended to encompass all stages of interaction and/or reaction between the first and second components, including reaction products of the first and second components, even when the reaction product contacts the aggregate to form the composite material. Generally, the reaction product begins to form when the first and second components come into contact with each other. In one embodiment, the reaction product is a polyurethane wherein the first component is an isocyanate component and the second component is an isocyanate-reactive component. Table I below shows the constituents and properties of a polymeric binder composition suitable for use with the disclosed systems and processes:

TABLE I

| Polymeric Binder Composition Components and Properties | |
|---|---|
| Resin Component (components by weight %) | |
| Hydrophobic Polyol (castor oil, commercially available from Eagle Specialty Products, Inc. | 92.45 |
| Chain Extender (DPG) | 7.00 |
| Molecular Sieve (3A) | 0.50 |
| Antifoaming Agent (Antifoam A, commercially available from Dow Corning) | 0.05 |
| Isocyanate Component (components by weight %) | |
| Isocyanate-prepolymer (liquid, modified short chain prepolymer based on pure 4,4'-MDI and having an NCO content of 22.9 wt. %, commercially available from BASF Corporation.) | 60.00 |
| Polymeric isocyanate (PMDI with a functionality of about 2.7 and an NCO content of 31.5 wt. %, commercially available from BASF Corporation.) | 40.00 |
| Polymeric Binder Composition Properties: | |
| Resin/Isocyanate Weight Ratio | 1.404 |
| Isocyanate Index | 121 |
| Tensile Strength, psi | 2,685 |
| Elongation, % | 100 |
| Grave's Tear Strength, ppi | 426 |
| Durometer Shore Hardness | D 56 |

TABLE I-continued

Polymeric Binder Composition Components and Properties

| Peel Strength | ppi 75 |
| Tg, ° C. | 44 |

As mentioned previously, the polymeric binder composition may be colored to provide a colored composite pavement structure through the use of a colorant having a first color. By use of the term "colorant" it is meant to broadly include any type of colorant, such as pigments, dyes, and combinations thereof. Non-limiting examples of the first color are red, blue, green, yellow, brown, black, white, and combinations thereof. Benefits of using a colored polymeric binder composition are improved aesthetic appeal of the composite pavement structure and additional UV protection of the polymeric binder composition. These benefits can be achieved without a significant reduction in the Solar Reflective Index (SRI) of the composite pavement structure, as shown in Table II below.

TABLE II

Solar Reflective Index (SRI) for Pavement

|  | SRI |
| --- | --- |
| Glass Aggregate Composite Pavement Structures: | |
| E1, "Sapphire Blue" | 49 |
| E2, "Topaz Brown" | 51 |
| E3, "Sedona Red" | 53 |
| E4, "Amber Brown" | 61 |
| E5, "Jade Green" | 62 |
| E6, uncolored | 69 |
| Prior Art Pavement Structures: | |
| New Asphalt | 0 |
| Old Asphalt | 6 |
| New Concrete | 38-52 |
| Old Concrete | 19-32 |

As shown in Table I, the colored embodiments of the composite pavement structures each have excellent SRI values that are substantially greater than 29. Many colors other than those listed in Table I are also possible. As compared to prior art asphalt and concrete pavement structures, a glass aggregate based colored composite porous pavement structure can provide a more aesthetically desirable pavement with improved reflectivity. The SRI values shown in Table I were conducted in accordance with ASTM E 1980.

To provide the colored polymeric binder composition, an inorganic colorant may be provided. If employed, the colorant is typically a pigment or a pigment blend of two or more pigments. The pigment, or pigment blend, is used to impart a desired color to the composite material. Different types of pigments can be used for purposes of the present disclosure. For example, titanium dioxide can be used to impart a white color and carbon black can be used to impart a black color, to the composite material, respectively, while various blends of titanium dioxide and carbon black can be used to impart various shades of gray to the composite material. Examples of suitable grades of carbon black and titanium dioxide for purposes of the present invention are commercially available from Columbian Chemicals Company of Marietta, Ga., and DuPont® Titanium Technologies of Wilmington, Del., respectively. Other pigments including, but not limited to, red, green, blue, yellow, green, and brown, and pigment blends thereof, can also be used to impart color to the composite material in addition to or alternative to carbon black and/or titanium dioxide. Examples of suitable grades of pigments for purposes of the present invention are commercially available from various companies such as BASF Corporation and Penn Color, Inc. of Hatfield, Pa. It is to be appreciated that various blends of the aforementioned colorants, e.g. pigments, can be used to impart the composite material with various colors, strengths, and shades.

If employed in the composite material, the colorant is typically present in the composite material in an amount suitable to impart the composite material with a desired color, strength and shade, while not materially affecting physical properties of the composite material. In certain embodiments employing the colorant, the colorant is typically present in the polymeric binder composition in an amount of from about 0.1 to about 10, and more typically of from about 0.1 to about 5, parts by weight, based on 100 parts by weight of the binder composition.

Where the employed colorant is a solid or powder, such as a dry pigment powder, it is useful to combine the colorant with a dilutant to form a colorant concentrate that will flow and can be readily pumped. Where the colorant is an inorganic pigment powder and the dilutant is a resin, the pigment is present in the colorant concentrate in an amount of about 10 to about 35 parts by weight, and more typically about 32 parts by weight, based on 100 parts by weight colorant concentrate. In some embodiments, the dilutant is one of the first component or the second component of the polymeric binder composition. The process of forming the colorant concentrate may be performed in the field, or more preferably, within a facility where the environment may be more carefully controlled. Benefits of preparing the colorant concentrate in a controlled environment are increased accuracy and the minimization of waste caused by wind and other field conditions.

Once formed, the colorant concentrate may be introduced into the polymeric binder composition. In one embodiment, the colorant concentrate is first combined with the first component of the polymeric binder composition. In one embodiment, the colorant concentrate is first combined with the second component of the polymeric binder composition. In one embodiment, the colorant concentrate and the first and second components of the polymeric binder composition are combined simultaneously. Where the dilutant matches the first or second components of the polymeric binder composition, the colorant concentrate is typically combined with either the component matching the dilutant or combined simultaneously with both components. Additionally, where the dilutant matches the first or second components, the amount of dilutant present in the concentrate is typically taken into account when determining the volume of the first and second components to be combined. Once combined, the colorant concentrate and the first and second components form a colored polymeric binder composition.

When the colored polymeric binder composition is mixed with the glass aggregate particles, the polymeric binder composition will react and bond with the glass to form a colored composite material that, once cured, will be a colored composite pavement structure. As noted above, greater structural strength can be achieved when using silylated glass aggregate particles. While the composite material is still workable, the colored composite pavement structure may be applied to a compacted surface and subsequently screeded and troweled. Once the polymeric binder composition has fully cured, the composite pavement structure will be ready for use.

Figure 4:
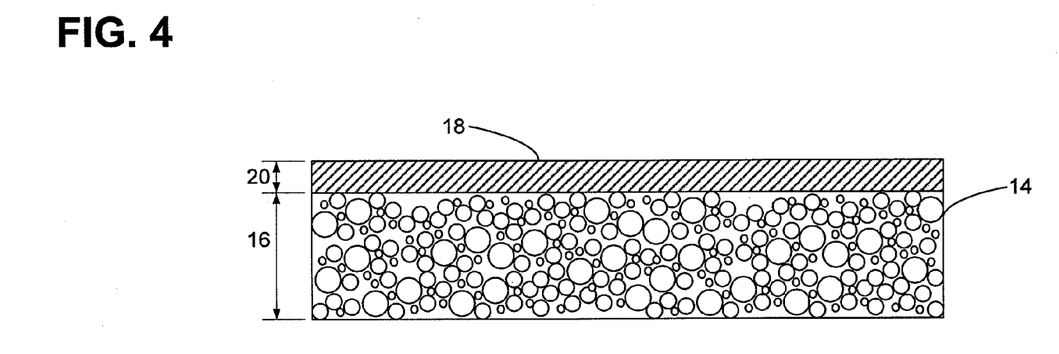
FIG. 4 is a schematic showing a cross-section of a colored composite pavement structure having a top coating.

After the composite pavement structure has been formed for about a day, an optional top coating may be applied to the surface of the structure, as shown in FIG. 4. In one embodiment, the top coating 18 is a two component modified aliphatic polyurea which increases the wear performance the colored composite pavement structure 14, which may be water pervious or porous. The top coating 18 may be clear or be tinted to match the first color of the colorant used for the colored composite pavement structure 14. Where a tinted top coat 18 is used, additional UV protection of the composite pavement structure 14 is realized. The top coating may be applied by spraying or rolling. In the embodiment shown, the composite pavement structure has a thickness 20 of about 1 mil to about 10 mils, and most preferably of about 5 to about 6 mils. It should be noted that where the composite pavement structure 14 is porous, that the thickness of the top coating is not precisely controllable and that the above identified thicknesses are general approximations. Examples of suitable top coatings for purposes of the present disclosure are commercially available from various companies such as VersaFlex Incorporated of Kansas City, Kans. The thickness 16 of the composite pavement structure may vary considerably depending upon the intended application. A thickness 16 of about 2.5 inches to about 3.5 inches is suitable for many applications.

Figure 2:
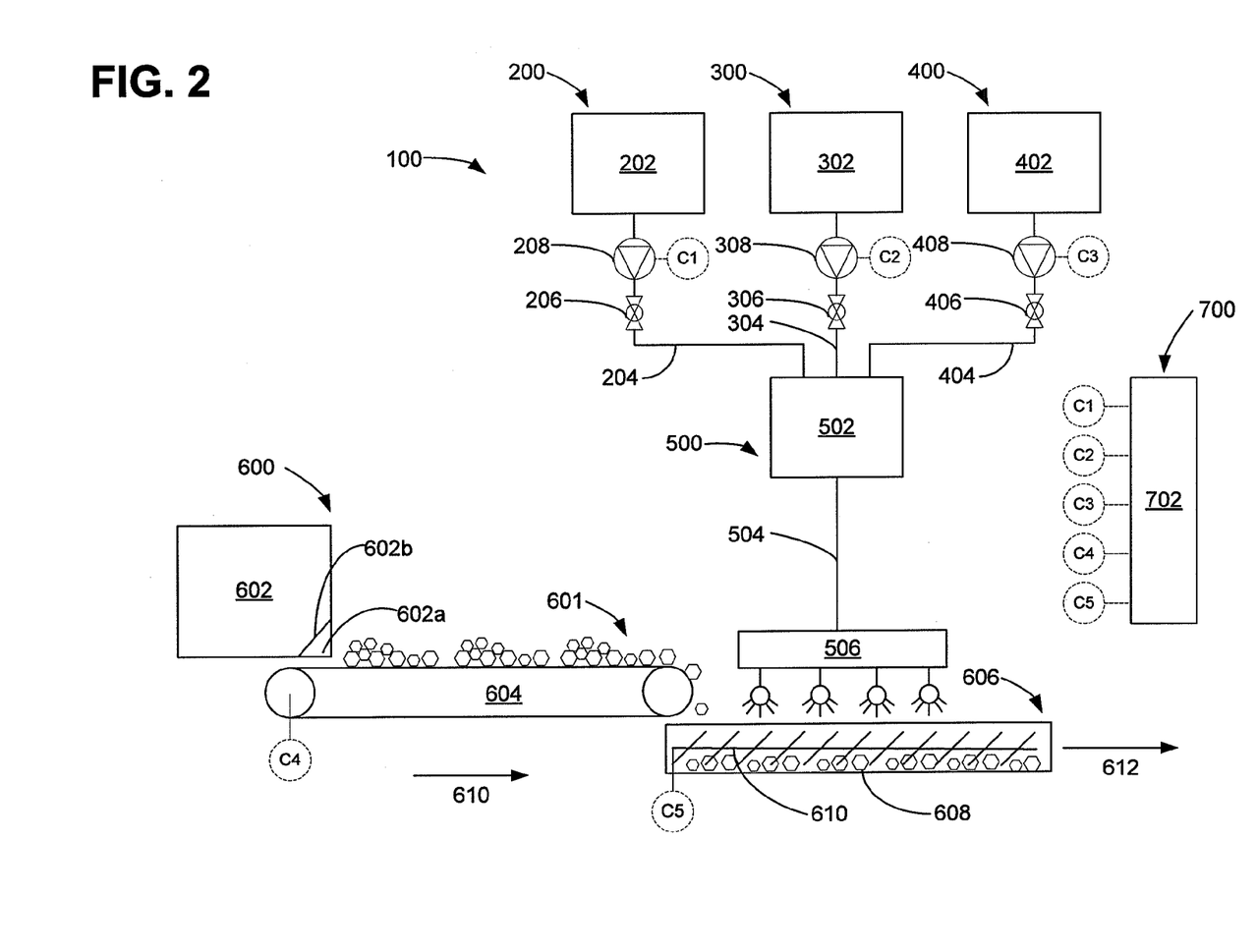
FIG. 2 is a schematic showing a first embodiment of a system for providing a colored composite pavement structure.
Figure 3:
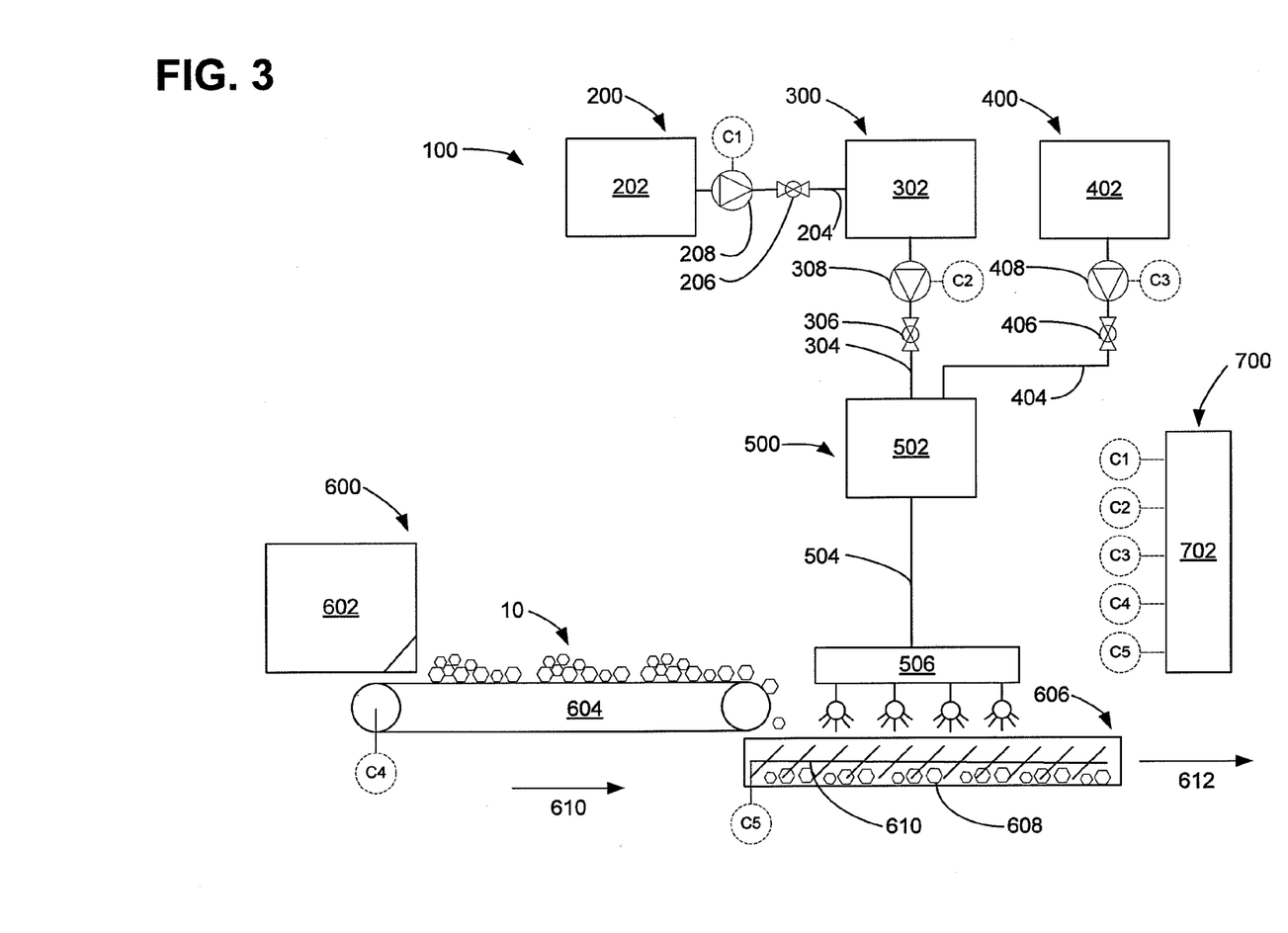
FIG. 3 is a schematic showing a second embodiment of a system for providing a colored composite pavement structure.

With reference to FIGS. 2 and 3, a mixing system 100 for producing the disclosed colored composite material curable into a colored composite pavement structure is shown.

One aspect of the mixing system 100 is aggregate feed system 600. Aggregate feed system 600 is for storing and subsequently transporting aggregate particles 601 through the mixing system 100. Many embodiments of the aggregate feed system 600 are possible. In the exemplary embodiment shown in FIGS. 2 and 3, aggregate feed system 600 includes an aggregate storage vessel 602. It is to be appreciated that any type of vessel 602 suitable for holding the aggregate can be employed. Typically, the aggregate vessel 602 defines a hole 602a. The aggregate vessel 602 also includes a gate 602b, the gate 602b typically being adjacent to the hole. The gate 602b is operable between an open and closed position, such that when the gate 602b is in the closed position the aggregate is retained within the aggregate vessel 602, and when the gate is in the open position, the aggregate exits the aggregate vessel 602 through the hole. It is to be appreciated that the aggregate may exit the aggregate vessel 602 by other methods known in the art without departing from the scope of the present invention. If an additive component is employed, the mixing system 602 can include an additive vessel (not shown) for holding the additive component. Alternatively, the additive component may be disposed into at least one of the aggregate vessels 602.

Aggregate feed system 600 is also shown as having a conveyer apparatus 604 and a mixing apparatus 606. Conveyor 604 is for transporting the aggregate 601 from the aggregate vessel 602 to the mixing apparatus 606 at a delivery rate in direction 610. In the particular embodiment shown, conveyor 604 is a belt type conveyor although other types of conveyors are suitable for this purpose. Mixing apparatus 606 is for mixing the aggregate with the colored polymeric binder composition. In the particular embodiment shown, mixing apparatus 606 is an auger type system including a housing 608 defining a channel within which an auger 610 is rotatably disposed. The auger 610 includes a shaft with flighting in a spiral configuration such that the rotation of the auger 610 results in the composite material moving in direction 612 along the length of the housing 608. The shaft can also include one or more pins or fingers for additional mixing. As the composite material is moved within the channel, the auger 610 mixes the composite material to increase the surface area of the aggregate exposed to the reaction product of the polymeric binder composition thereby coating the aggregate with the reaction product of the binder composition. The mixing of the composite material by the auger 610 ensures that the colored composite material produced by the mixing system 20 is uniform and consistent. As the composite material reaches the end of the channel, the composite material is dispensed from the housing 608 at a production rate. One skilled in the art will appreciate that many other types of aggregate feed systems 600 are suitable for the above stated purposes.

The mixing system 100 is shown as further including three delivery systems: a colorant concentrate delivery system 200, a first component delivery system 300, and a second component delivery system 400. Each of the delivery systems 200, 300, 400 is for storing and delivering the stored component to a mixing system 500, discussed later. Many embodiments of delivery systems 200, 300, 400 are possible without departing from the concepts discussed herein. As shown, each of delivery systems 200, 300, 400 include a valve 206, 306, 406 and a pump 208, 308, 408 which deliver the components to mixing system 500 via lines 204, 304, and 404 from first, second, and third storage vessels 202, 302, 402, respectively. In the embodiment shown, storage vessel 202 holds the colorant concentrate system independently of the first component, stored in vessel 302, and independently of the second component, stored in vessel 402. In the embodiment shown in FIG. 2, the colorant concentrate, the first component and the second component of the polymeric binder composition are provided to the mixing system 500 independent of each other, i.e. prior to mixing. FIG. 3 differs from FIG. 2 in that the colorant concentrate is delivered from vessel 202 to vessel 302 directly rather than to mixing system 500. It is to be appreciated that the colorant concentrate and the first and second components may be dispensed from the vessels 202, 302, and 402 by any suitable method.

As stated above, the delivery systems 200, 300, and 400 can include a pump 208, 308, 408 in fluid communication with the vessels 202, 302, 402, respectively. The pumps 208, 308, 408 dispense the concentrate and first and second components in an appropriate ratio as required to form the reaction product of the two-component polymeric binder composition. If the pumps 208, 308, 408 are employed, the pumps can comprise a motor for rotating the pumps to control the delivery rate of the respective component. Each pump 208, 308, 408 may have an integral and/or individual motor, or the pumps may be mechanically coupled together, such as by a chain, and driven by a single motor. In the latter case, the gearing of the couplings can be modified such that the desired output ratio of components is attained.

As stated above, delivery systems 200, 300, 400 may also each include a valve in fluid communication with the mixer 502, as shown in FIGS. 2 and 3. The valves 206, 306, 406 are operable between an open position and a closed position and are for preventing the introduction of air into the mixer 502 when the mixing system 100 is idle. In the particular embodiment shown, valves 206, 306, 406 are located between the mixer 502 and the vessel 202, 302, 402 associated with the valve. It is to be appreciated that a single valve can be located downstream of the mixer 502 such that the concentrate and the first and second components are mixed by the mixer 502 prior to passing through the valve.

As stated above, mixing system 100 may further include a mixing system 500 having a mixer 502 in communication with vessels 202, 302, 402 for mixing the colorant concentrate, the first component and the second component to produce the colored polymeric binder composition. The mixer 502, also referred to in the art as a mix head, intimately mixes the colorant concentrate and the first and second components to produce the reaction product of the binder composition. It is to be appreciated that the mixer 502 can be of any type suitable for mixing the components, such as mechanical mixers and non-mechanical mixers. For example, in one embodiment, the mixer 502 is a static mixer for mixing the first and second components to form the reaction product of the binder composition.

Mixing system 500 may also further include an applicator 506 in fluid communication with the mixer 502 via line 504, as shown in FIGS. 2 and 3. The applicator 506 applies the reaction product of the binder composition at an application rate to the aggregate disposed in the mixing apparatus 606. It is to be appreciated that the mixer 502 may also be the applicator 506. For example, the mixer 502 may be an impingement mixer, which directs separate streams of the concentrate and first and second components component together for mixing the concentrate and first and second components to form the reaction product of the binder composition while simultaneously applying the colored reaction product of the binder composition. Alternatively, applicator 506 may be a sprayer or a manifold comprising spray heads, as shown in FIGS. 2 and 3. When applicator 506 is configured as a sprayer, compressed air may also be provided to aid in the formation of the fluid spray pattern.

Figure 5:
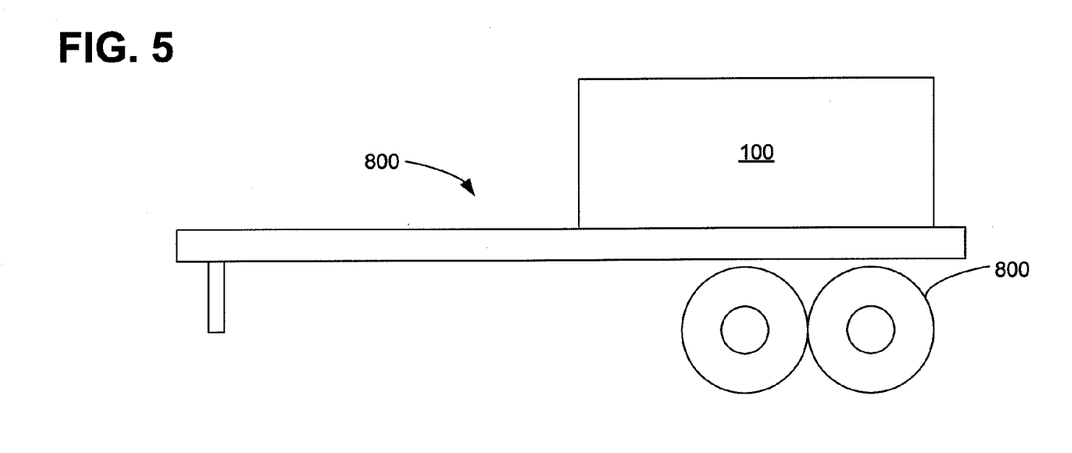
FIG. 5 is a schematic showing a system for providing a colored composite pavement structure on a mobile platform.

The mixing system 100 may further include a platform 800 for holding the components of mixing system 100. At least one of the aggregate vessel 602, the vessels 202, 302, 042, the conveyor 604, and the mixing apparatus 606 are typically disposed on the platform 800. Although not required, the mixing system 100 may include the platform for transporting the mixing system 100 thereby making the mixing system 100 portable between job sites. It is to be appreciated that the mixing system 100 may also be transported to the job site and assembled on the ground or supported by another structure such that the mixing system 100 is generally non-portable. In one embodiment employing the platform 800, shown in FIG. 5, each of the delivery systems 200, 300, 400, 600 are disposed on a mobile platform 800 having wheels 802. In FIG. 5, platform 800 is shown as wheeled trailer. Platform 800 may also be a portion of a flatbed truck or made otherwise mobile.

The mixing system 100 may be powered by a variety of power sources. For example, the pumps, conveyor and mixing apparatus may be activated by electric motors powered by a generator or any other electrical power source. Alternatively, the equipment may be powered hydraulically through a PTO system of an engine. Many other means for powering the mixing system 100 are possible.

Generally, the aggregate 601 is provided to the mixing apparatus 606 at a delivery rate and the reaction product of the colored polymeric binder composition is applied to the aggregate within the mixing apparatus 606 at an application rate to produce the composite material. It is to be appreciated that the composite material is produced once the reaction product of the binder composition contacts the aggregate. The reaction product can be formed before, after, or contemporaneously with contacting the aggregate. The delivery rate is dependent, in part, on an amount of the composite material the mixing system 100 is to produce. Likewise, the application rate of the reaction product to the aggregate is generally dependent on the delivery rate of the aggregate to the mixing apparatus 606. If the pumps 208, 308, 408 are employed, the pumps can vary the application rate of the reaction product of the binder composition dependent, in part, on the delivery rate of the aggregate. Typically, the application rate of the reaction product to the aggregate is typically of from about 1 to about 7, and more typically from about 1.8 to about 5 gallons per cubic feet of the aggregate provided into the channel. The composite material is pliable as it is dispensed from the channel for allowing the composite material to be shaped into a desired configuration, i.e. the composite material has sufficient working time after dispensing. The mixing system 100 is capable of producing and dispensing the composite material in about 5 to about 15 seconds. This relatively short production time ensures that the composite material will be pliable for some time after it is dispensed from the housing 608, typically at least about 10 minutes.

In order to ensure that the delivery rates, application rates, production rates, and other rates are optimal, a control system 700 may be provided. The control system 700 may be mechanical, electro-mechanical, and/or electronic. In the embodiments shown in FIGS. 2 and 3, control system 700 includes a controller 702 configured to monitor and/or control the delivery rates of the colorant concentrate, the first component, the second component, the aggregate on conveyor 604, and the composite material on mixing apparatus 606 via control points C1, C2, C3, C4, and C5 respectively. In one embodiment controller 702 can control and receive the delivery rate of the aggregate on the conveyor and thereby set the output of pumps 208, 308, and 608 to attain the desired application rate from applicator 506. The controller 702 may control the production rate of the mixing apparatus 606 based on the sensed or commanded delivery rates and application rates. One skilled in the art will also appreciate that manual control of the mixing system 100 is possible.

The above are example principles. Many embodiments can be made.

We claim:

1. A process for making a colored composite pavement structure, the process including the steps of:
   providing a colorant having a first color;
   providing a dilutant;
   providing a first component and a second component of a polymeric binder composition;
   combining the colorant with the dilutant to provide a colorant concentrate having about 10 to about 35 parts by weight colorant based on 100 parts by weight colorant concentrate;
   combining the colorant concentrate and the first and second components of the polymeric binder composition to provide a colored polymeric binder composition having about 0.1 to about 10 parts by weight colorant based on 100 parts by weight of colored polymeric binder composition;
   providing glass aggregate particles ranging from about 1/16 inch to about 1/2 inch in diameter;
   mixing the glass aggregate particles with the colored polymeric binder composition to form a mixture;
   applying the mixture to a compacted surface; and
   allowing the polymeric binder composition to react, bond and cure with the glass aggregate particles to provide the colored composite pavement structure.

2. The process according to claim 1, further comprising the step of:

applying a top coating over the colored composite pavement structure, the top coating comprising an inorganic pigment powder having the first color.

3. The process according to claim 1, wherein the step of combining the colorant concentrate and the first and second components of the polymeric binder composition comprises combining the colorant concentrate with the first component to provide a colored first component and then combining the colored first component with the second component.

4. The process according to claim 1, wherein the step of providing a first component and a second component of a polymeric binder composition includes providing a first component comprising a resin and a second component reactive with the first component.

5. The process according to claim 1, wherein the step of providing a first component and a second component of a polymeric binder composition includes providing a first component comprising a polymeric isocyanate component and a second component comprising an isocyanate-reactive component.

6. The process according to claim 1, wherein the step of providing glass aggregate particles includes providing recycled glass.

7. The process according to claim 1, wherein the step of providing glass aggregate particles includes providing silylated glass.

8. The process according to claim 1, wherein the step of providing a colorant includes providing a colorant in a quantity sufficient to result in the colored composite pavement product having a Solar Reflective Index (SRI) of at least about 29.

9. The process according to claim 1, wherein the step of providing a dilutant includes providing a dilutant that is the first component of the polymeric binder composition.

10. The process according to claim 3, wherein the step of providing glass aggregate particles includes providing silylated glass.

11. The process according to claim 5, wherein the step of providing glass aggregate particles includes providing silylated glass.

12. The process according to claim 11, wherein the step of providing a colorant includes providing a colorant in a quantity sufficient to result in the colored composite pavement product having a Solar Reflective Index (SRI) of at least about 29.

13. The process according to claim 8, wherein the step of providing glass aggregate particles includes providing silylated glass.

* * * * *